United States Patent
Takahashi et al.

(10) Patent No.: US 7,502,956 B2
(45) Date of Patent: Mar. 10, 2009

(54) INFORMATION PROCESSING APPARATUS AND ERROR DETECTING METHOD

(75) Inventors: Jin Takahashi, Kawasaki (JP); Seishi Okada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 562 days.

(21) Appl. No.: 10/985,042

(22) Filed: Nov. 10, 2004

(65) Prior Publication Data

US 2006/0020851 A1    Jan. 26, 2006

(30) Foreign Application Priority Data

Jul. 22, 2004    (JP)    ............... 2004-214787

(51) Int. Cl.
*G06F 11/00*    (2006.01)

(52) U.S. Cl. .......................... 714/11; 714/12

(58) Field of Classification Search ............ 714/11, 714/12

See application file for complete search history.

(56) References Cited

U.S. PATENT DOCUMENTS

| | | | |
|---|---|---|---|
| 5,535,164 A | 7/1996 | Adams et al. | |
| 5,812,757 A | 9/1998 | Okamoto et al. | |
| 6,233,680 B1 | 5/2001 | Bossen et al. | |
| 6,360,333 B1* | 3/2002 | Jansen et al. | 714/25 |
| 6,675,324 B2* | 1/2004 | Marisetty et al. | 714/30 |
| 6,931,564 B2* | 8/2005 | Goodman et al. | 714/4 |
| 6,944,788 B2* | 9/2005 | Dinker et al. | 714/4 |
| 2005/0273653 A1* | 12/2005 | Zubkow | 714/11 |

FOREIGN PATENT DOCUMENTS

| | | |
|---|---|---|
| JP | 57-101954 | 6/1982 |
| JP | 60-063641 | 4/1985 |
| JP | 62-001040 | 1/1987 |
| JP | 1-295344 | 11/1989 |
| JP | 5-134998 | 6/1993 |
| JP | 5-224964 | 9/1993 |
| JP | 5-265812 | 10/1993 |
| JP | 5-282167 | 10/1993 |
| JP | 7-175765 | 7/1995 |
| JP | 7-200460 | 8/1995 |
| JP | 7-219812 | 8/1995 |
| JP | 7-219817 | 8/1995 |
| JP | 7-319836 | 12/1995 |
| JP | 8-36554 | 2/1996 |

(Continued)

OTHER PUBLICATIONS

Chinese First Notification of Office Action issued Jan. 19, 2007 in corresponding Chinese Application No. 200410096110.9.

(Continued)

*Primary Examiner*—Marc Duncan
(74) *Attorney, Agent, or Firm*—Staas & Halsey LLP (57) ABSTRACT

An information processing apparatus includes a plurality of computing units. At least one of the computing units includes a recording unit that records a status of an error occurrence in each of the computing units. The each of the computing units includes an error notifying unit that notifies the error occurrence to at least one of the computing units that includes the recording unit when an error occurs in the each of the computing units itself.

9 Claims, 7 Drawing Sheets

| | FOREIGN PATENT DOCUMENTS | |
|---|---|---|
| JP | 8-190492 | 7/1996 |
| JP | 9-212388 | 8/1997 |
| JP | 9-212470 | 8/1997 |
| JP | 10-091543 | 4/1998 |
| JP | 10-133963 | 5/1998 |
| JP | 2002-091799 | 3/2002 |
| JP | 2003-114811 | 4/2003 |

OTHER PUBLICATIONS

Japanese Patent Office Action, mailed Sep. 24, 2008 and issued in corresponding Japanese Patent Application No. 2004-214787.

Search/Examination Report in corresponding Korean Patent Application No. 024019266 dated Apr. 26, 2006.

* cited by examiner

INFORMATION PROCESSING APPARATUS AND ERROR DETECTING METHOD

BACKGROUND OF THE INVENTION

1) Field of the Invention

The present invention relates to an information processing apparatus having a plurality of computing units and an error detection method for the information processing apparatus, and more particularly, to an error detection method in a large-scale information processing apparatus.

2) Description of the Related Art

In order to meet a demand for enhancement of performance of an information processing apparatus (such as a computer system), an information processing apparatus that carries out processing allowing a plurality of computing units to cooperate with one another is currently in use, such as a computer system in which a plurality of function boards to realize predetermined functions are connected to one another, and a computer system provided with a plurality of processors.

In such an information processing apparatus having a plurality of computing units, it is necessary that a notice of error be executed to other computing units at a time of error occurrence, and that a control be shifted to an error analysis processing at an early stage.

For example, Japanese Patent Application Laid-Open Publication No. 1995-219812 discloses a failure monitoring system to give a notice of error in a multiprocessor system in which a plurality of function boards are connected to one another by a system bus without the use of an interrupt function. Japanese Patent Application Laid-Open Publication No. 1993-224964 discloses a bus failure notifying system that notifies information of a bus abnormality occurring on the common bus.

Furthermore, Japanese Patent Application Laid-Open Publication No. 2002-91799 discloses a condition monitoring system provided with a board exclusive to monitoring of error in an information processing apparatus having a plurality of function boards, and Japanese Patent Application Laid-Open Publication No. 1985-63641 discloses an error processing circuit of a computer system.

Moreover, Japanese Patent Application Laid-Open Publication No. 1982-101954 discloses an error notifying system of a logical unit; Japanese Patent Application Laid-Open Publication No. 1995-200460 discloses a notifying system of interrupt at the time of error occurrence; and Japanese Patent Application Laid-Open Publication No. 1993-265812 discloses an information processing apparatus provided with a micro diagnostic device.

Japanese Patent Application Laid-Open Publication No. 2003-114811 discloses an automatic failure-recovery method and system, and an automatic failure-recovery apparatus and program that are provided with a board exclusive to monitoring of errors, and Japanese Patent Application Laid-Open Publication No. 1993-282167 discloses a processing method for failure occurring in an information processing apparatus.

Still further, Japanese Patent Application Laid-Open Publication No. 1989-295344 discloses a data collection method for failure occurring in an information processing apparatus, and Japanese Patent Application Laid-Open Publication No. 1987-1040 discloses failure analysis on a computer provided exclusively with a board to monitor errors.

Japanese Patent Application Laid-Open Publication No. 1998-91543 discloses a recording method for failure information in an information processing apparatus, and Japanese Patent Application Laid-Open Publication No. 1998-133963 discloses a failure detection method and a recovery method for an information processing apparatus. Still further, a failure recovery method for an information processing apparatus is mentioned in Japanese Patent Application Laid-Open Publication No. 1995-175765.

As shown in the above literatures, a circuit that detects an error gives a notice to all computing units (function boards and processors) in the system in a conventional information processing apparatus (a computer system) when an error occurs in the system, and processing in the system pauses. Then, a representative computing unit (for example, main board or board exclusive to error analysis) among the computing units that have received the notice reads all error display registers in the system, followed by carrying out an error analysis.

However, when all the error display registers are read and the errors are analyzed in this manner, the volume of the registers to be read becomes larger as the scale of the system becomes larger, and as a result, the processing of programs becomes sluggish.

SUMMARY OF THE INVENTION

It is an object of the present invention to solve at least the above problems in the conventional technology.

An information processing apparatus according to one aspect of the present invention includes a plurality of computing units. At least one of the computing units includes a recording unit that records a status of an error occurrence in each of the computing units. The each of the computing units includes an error notifying unit that notifies the error occurrence to at least one of the computing units that includes the recording unit when an error occurs in the each of the computing units itself.

An error detection method according to another aspect of the present invention, which detects an error in an information processing apparatus having a plurality of computing units, includes causing each of the computing units to detect an error in the each of the computing units itself; causing a computing unit that has detected the error to notify an error occurrence to other computing units; causing a computing unit that has received a notice of the error occurrence to record the error in an recording unit that records a status of the error occurrence in the each of the computing units; and causing the computing unit that has received the notice of the error occurrence to perform an interrupt processing based on the error.

The other objects, features, and advantages of the present invention are specifically set forth in or will become apparent from the following detailed description of the invention when read in conjunction with the accompanying drawings.

DETAILED DESCRIPTION

Exemplary embodiments of an information processing apparatus and an error detection method according to the present invention are explained in detail with reference to the accompanying drawings.

Figure 1:
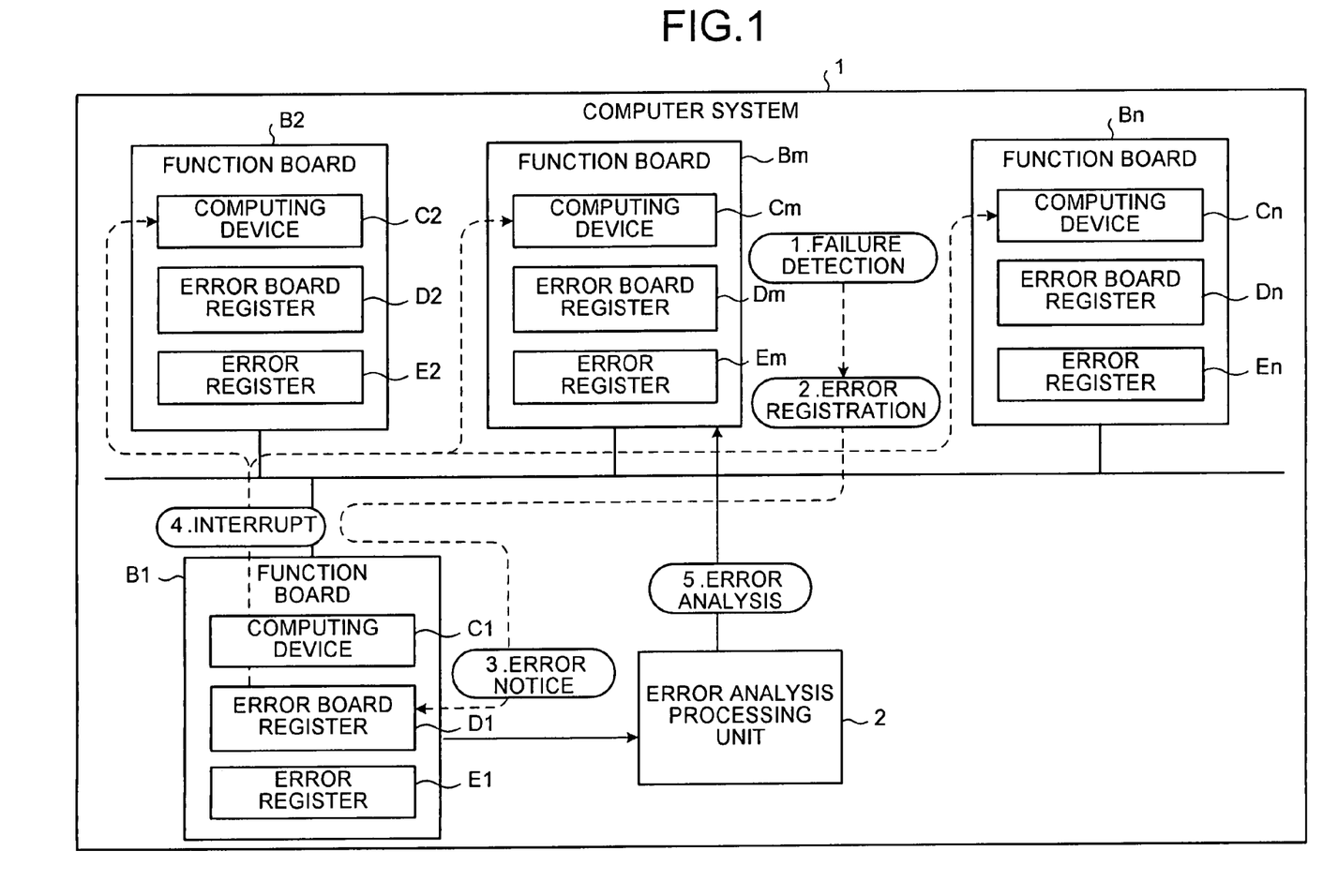
FIG. 1 is a schematic of a computer system according to an embodiment of the present invention.

FIG. 1 is a schematic of a computer system according to an embodiment of the present invention. A computer system 1 has n pieces of function boards B1 to Bn and an error analysis processing unit 2 inside the computer system 1.

The function boards B1 to Bn are computing units that realize their respective predetermined functions and that cooperate with one another. In addition, each function board has a computing device, an error board register, and an error register inside the function board.

Specifically, the function board B1 is provided with a computing device C1, an error board register D1, and an error register E1 inside the function board B1. The computing device C1 is a unit to carry out computation processing on the function board B1. The error register E1 is a bit register that is used when an error occurs in the function board B1. In other words, when the computing device B1 detects an error in the function board B1, it sets a bit corresponding to the error. Accordingly, this error register E1 functions as an error recording unit that indicates kind of error in the function board B1.

On the other hand, the error board register D1 is a recording unit that records the presence or absence of error occurrence with respect to each of a plurality of the function boards B1 to Bn.

Similarly, the function boards B1 to Bn have computing devices C2 to Cn, error board registers D2 to Dn, and error registers E2 to En, respectively.

In the computer system 1, one board that becomes a representative is determined from among the function boards B1 to Bn. On which function board an error has occurred inside the system is managed with the use of the error board register of the representative function board, and the board error registers of the other function boards are not used. This representative function board may be fixedly determined in advance, or any one of the function boards may be selected at the time of startup (boot).

For example, in a case where the function board B1 is the representative board and where a failure (error) occurs in the function board Bm, the computing device Cm of the function board Bm first detects the failure and registers it in the error register Em, followed by posting it to the function board B1 that serves as the representative board.

As a result, the function board B1 registers the error in the error board register D1, and the computing device C1 executes interrupt to the computing devices C1 to Cn of the respective function boards B1 to Bn.

After executions of the interrupt to all the function boards in the above way, the error analyzing unit 2 carries out error analysis processing with respect to the function board (here, the function board Bm) on which the error occurrence has been indicated to the error board register D1. Note that this error analysis processing unit 2 may be structured independently of each of the function boards, or may be structured inside of any one of the function boards.

Figure 2:
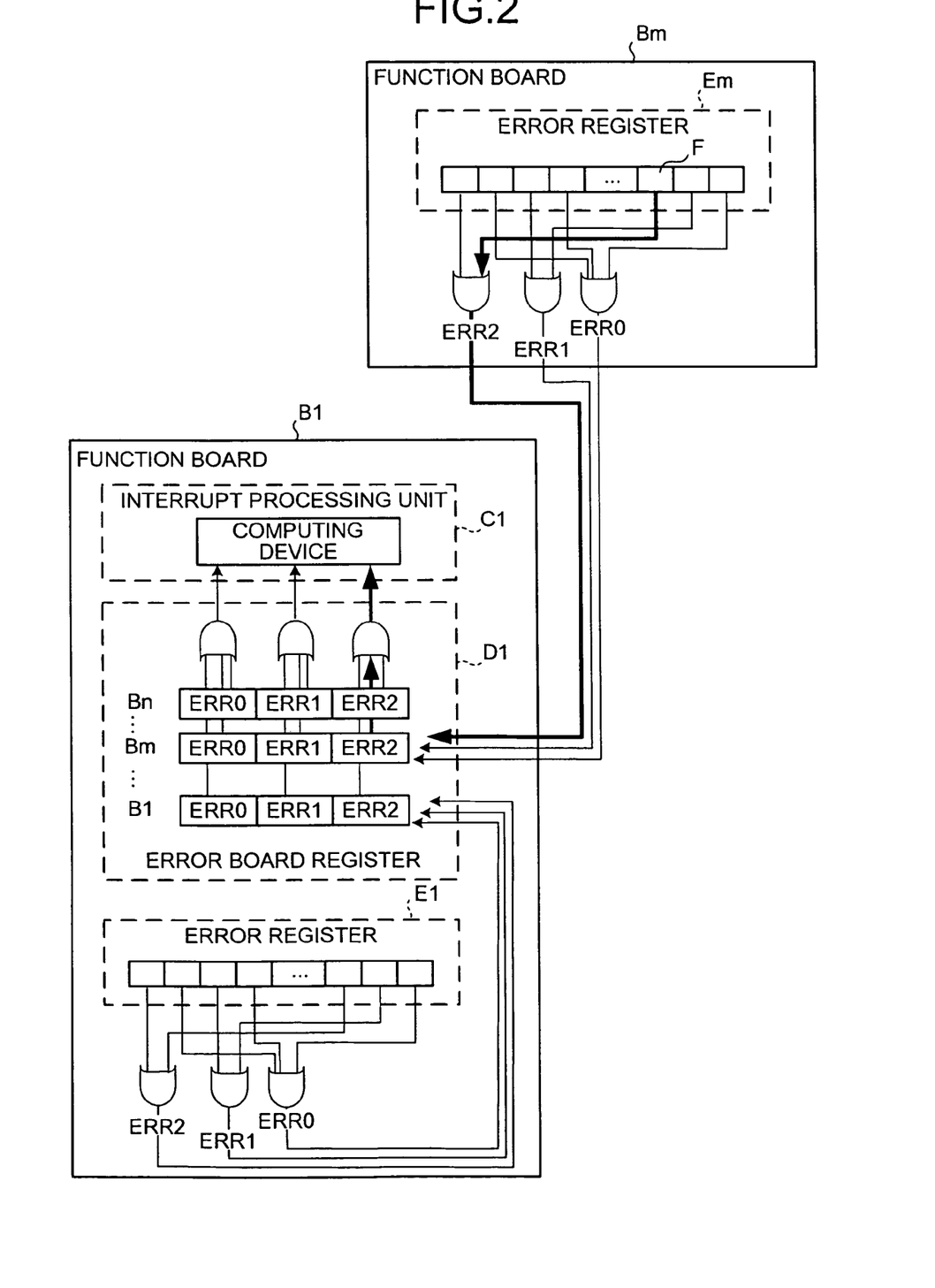
FIG. 2 is a schematic for illustrating an error posting and an interrupt processing.

FIG. 2 is a schematic for illustrating an error posting and an interrupt processing. When an error occurs in the function board Bm, a bit (for example, bit F) corresponding to the error that has occurred is set in the error register Em (the value of bit is set to 1).

Each bit in the error register has been input in OR circuits provided for every kind of error (in this example, error-ERR0, error-ERR1, and error-ERR2). The OR circuit outputs a value "1" when the value of any of the corresponding register bits becomes "1".

Thus, when the value of bit F becomes "1", the OR circuit corresponding to the error-ERR2 outputs "1".

Then, the function board Bm notifies this error occurrence to the representative function board B1. The error board D1 of the function board is provided with register bits corresponding to error-ERR0, error-ERR1, and error-ERR2 with respect to the function boards B1 to Bn, respectively. Therefore, at the time of receiving a notice of the occurrence of error-ERR2 from the function board Bm, the register bit corresponding the error-ERR2 of the function board Bm (register bit is set to "1") is set.

Further, the board error register D1 has circuits that implement logical addition of the values of respective function boards B1 to Bn with respect to the error-ERR0, the error-ERR1, and the error-ERR2. Therefore, the interrupt processing unit inside of the computing device C1 can judge the kind of error (errors-ERR0, ERR1, and ERR2) that has occurred in a function board inside the system, thereby allowing to carry out interrupt processing in accordance with the kind of the error.

Figure 3:
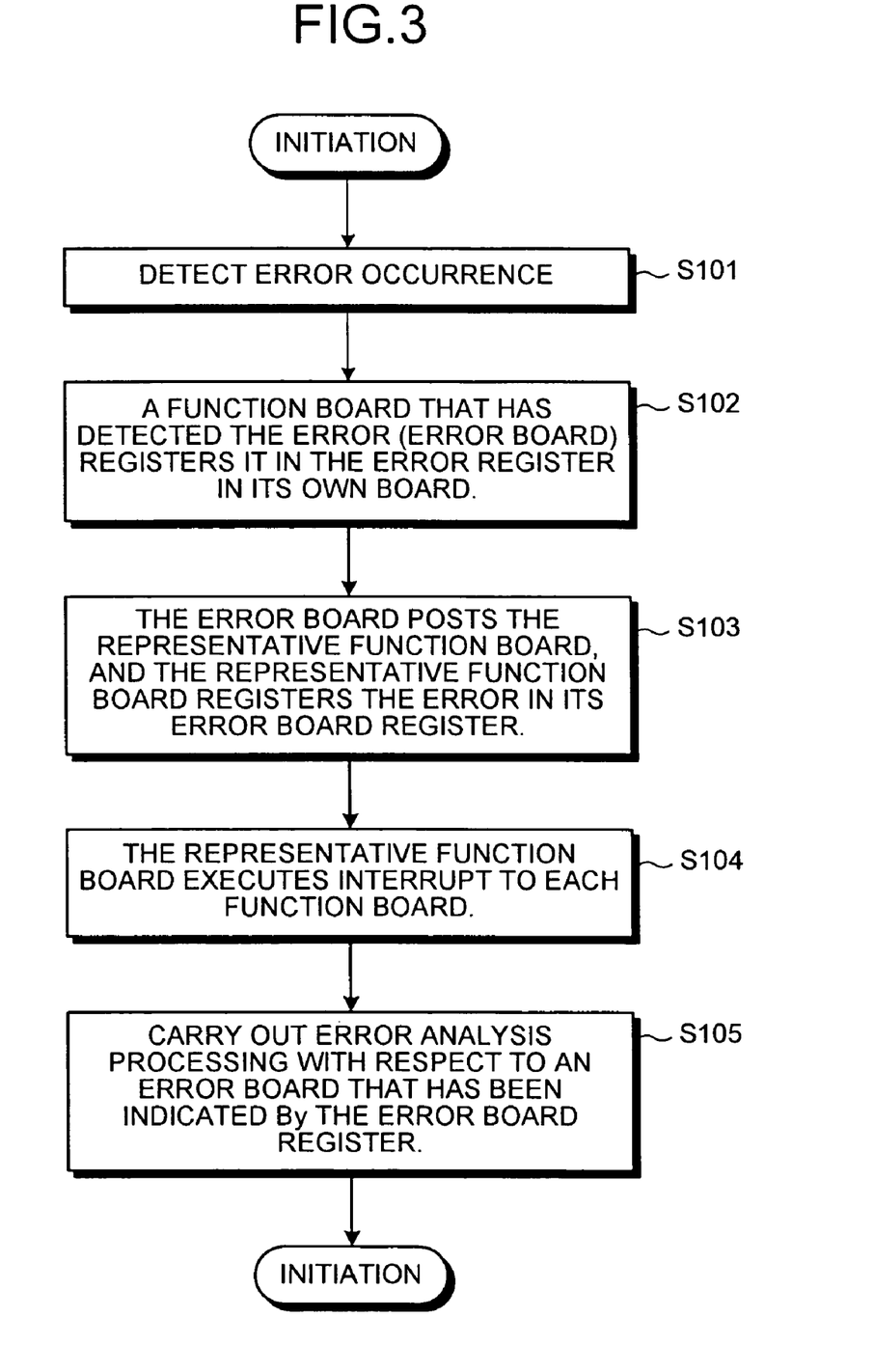
FIG. 3 is a flowchart of a process procedure for an operation of the computer system shown in FIG. 1.

FIG. 3 is a flowchart of a process procedure for an operation of the computer system shown in FIG. 1. In the computer system 1, each function board monitors errors in its own board.

When any one of the function boards detects an error in its own board (step S101), the function board that has detected the error (error board) registers the error in the error register in its own board (step S102).

Then, the error board notifies the error to the representative function board, and the representative function board registers the posted error in the error board register (step S103). After the representative function board executes interrupt to each function board (step S104), the error analysis processing unit 2 refers to the error board register, carries out error analysis processing with respect to the error board on which the error occurrence is indicated (step s105), and completes the processing.

In this manner, one of the function boards is determined as a representative function board, and the error board register of the representative function board manages on which function board an error occurs, whereby the function board that has detected the error may post the error only to the representative function board. Further, when error analysis processing is carried out, it is possible to specify the register of the error board and carry out error analysis selectively.

Therefore, it becomes unnecessary to read out all error registers of the function boards at the time of error occurrence, which makes it possible to carry out swift error processing without putting any loads on the system.

In the above explanations, the case in which a representative function board is determined and only the error board register of the representative function board is used was explained. However, the utilization of the present invention is not limited to the above. For example, it is also acceptable that each function boards specifies an error board with the use of its error board register without determining a representative function board.

Figure 4:
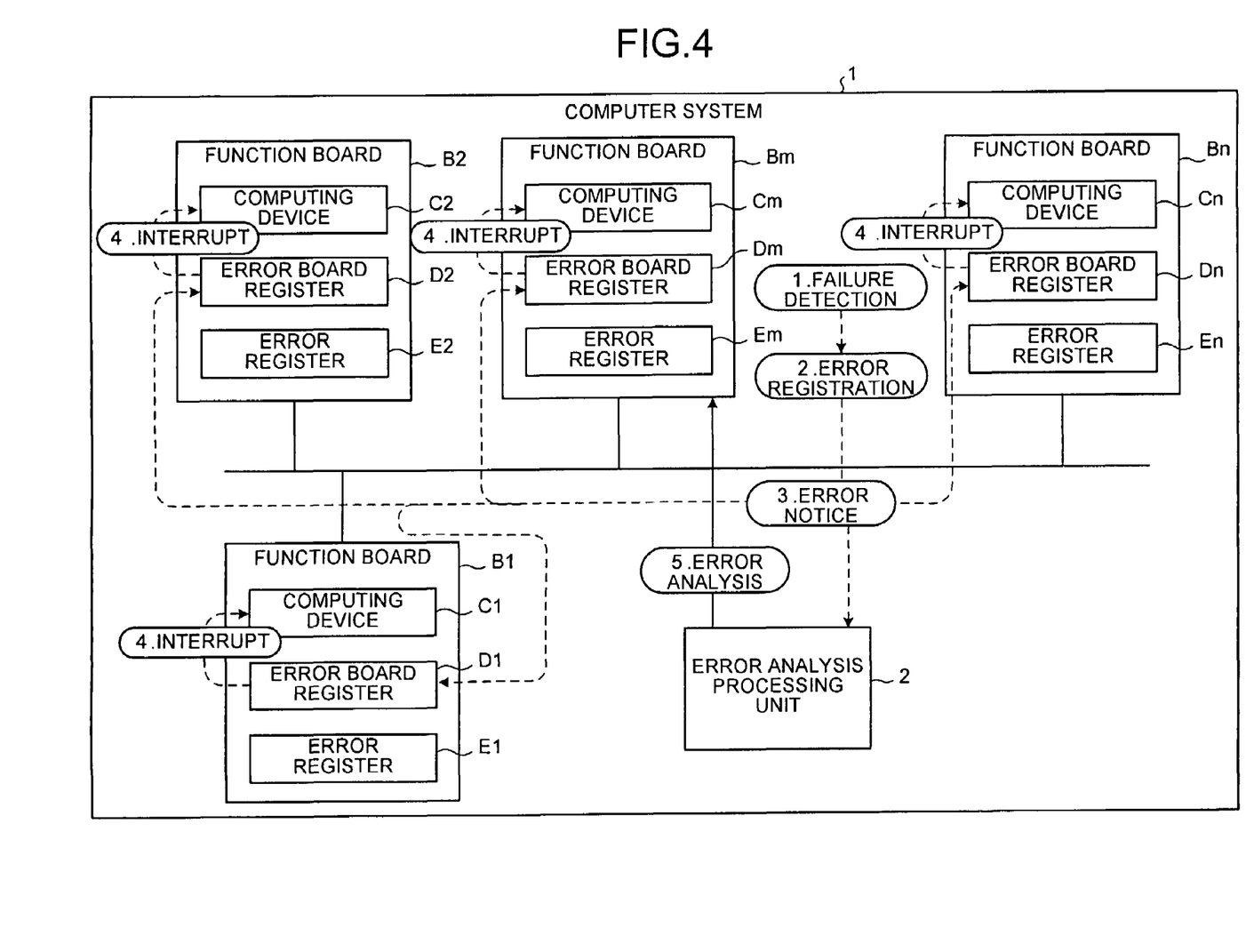
FIG. 4 is a schematic for illustrating an error detection of a computer system when a representative function board is not determined.

FIG. 4 is a schematic for illustrating an error detection of a computer system when a representative function board is not determined. The difference between FIG. 4 and FIG. 1 is the detection method for error, and the structure is similar to each other; therefore the same symbols are given to the same components, and their explanation is omitted.

For example, as shown in FIG. 4, when a failure (error) occurs in the function board function board Bm, the computing device Cm of the function board Bm detects the failure and registers it in the error register Em, followed by posting the error to all function boards (function boards B1 to Bn).

As a result, the function boards B1 to Bn that have received the error notice register the error in their respective error board registers D1 to Dn, followed by executing interrupt to the computing devices C1 to Cn of their own boards, respectively. After this, the error analysis processing unit 2 carries out error analysis processing with respect to the function board on which the error occurrence has been indicated in the error board register.

Figure 5:
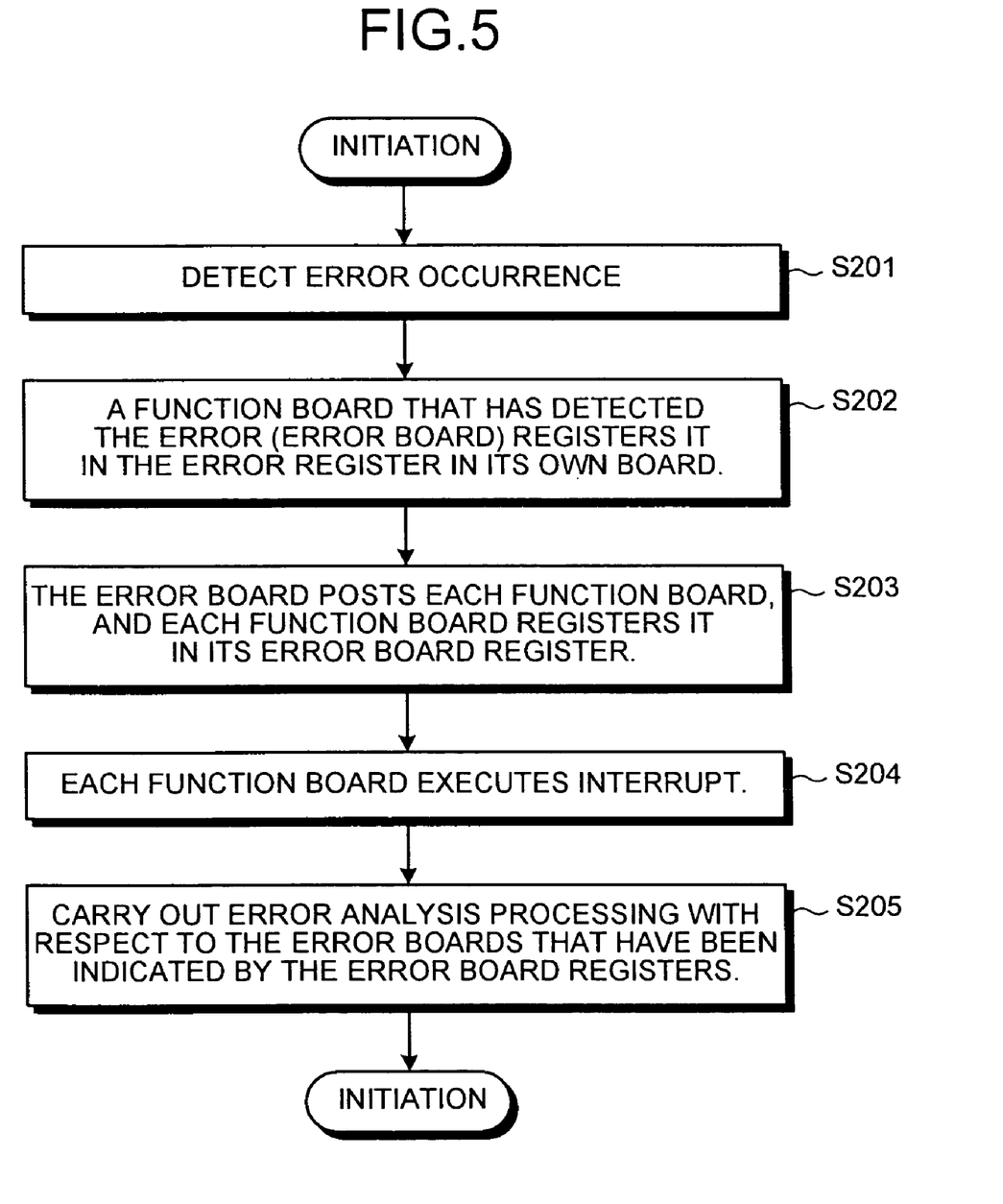
FIG. 5 is a flowchart of a process procedure for an operation of the computer system shown in FIG. 4.

FIG. 5 is a flowchart of a process procedure for an operation of the computer system shown in FIG. 4. First, when any one of the function boards detects an error in its own board (step S201), the function board that has detected the error (error board) registers the error in the error register in its own board (step S202).

After this, the error board notifies the error to all function boards, and each function board that has received the notice registers the error in its error board register (step S203). After each function board executes interrupt to its own processing (step S204), the error analysis processing unit 2 carries out error analysis processing (step S205) with respect to the error board on which the error occurrence is indicated with reference to the error board register, and completes the processing.

In this manner, the error board notifies the error occurrence to all function boards, and each function board manages on which function board an error has occurred by its error board register and carries out interrupt processing, whereby the function board that has detected the error may only post the error. When error analysis processing is carried out, it is possible to specify the register of the error board and carry out error analysis selectively.

Therefore, it is unnecessary to read out all error registers of the function boards at the time of error occurrence, which makes it possible to carry out swift error processing without putting any loads on the system.

In the above explanations, an example of a computer system having a plurality of function boards was explained. The respective function boards are computing units to realize the predetermined functions, respectively, as described above; however, these function boards themselves are provided inside with a plurality of computing units, for example, a large scale integrated circuit (LSI), and there are many cases in which their functions are realized by cooperation of the multiple LSIs.

Accordingly, the present invention is also applicable, similarly to error processing in the computer system, to error processing in the function board having a plurality of LSIs.

Figure 6:
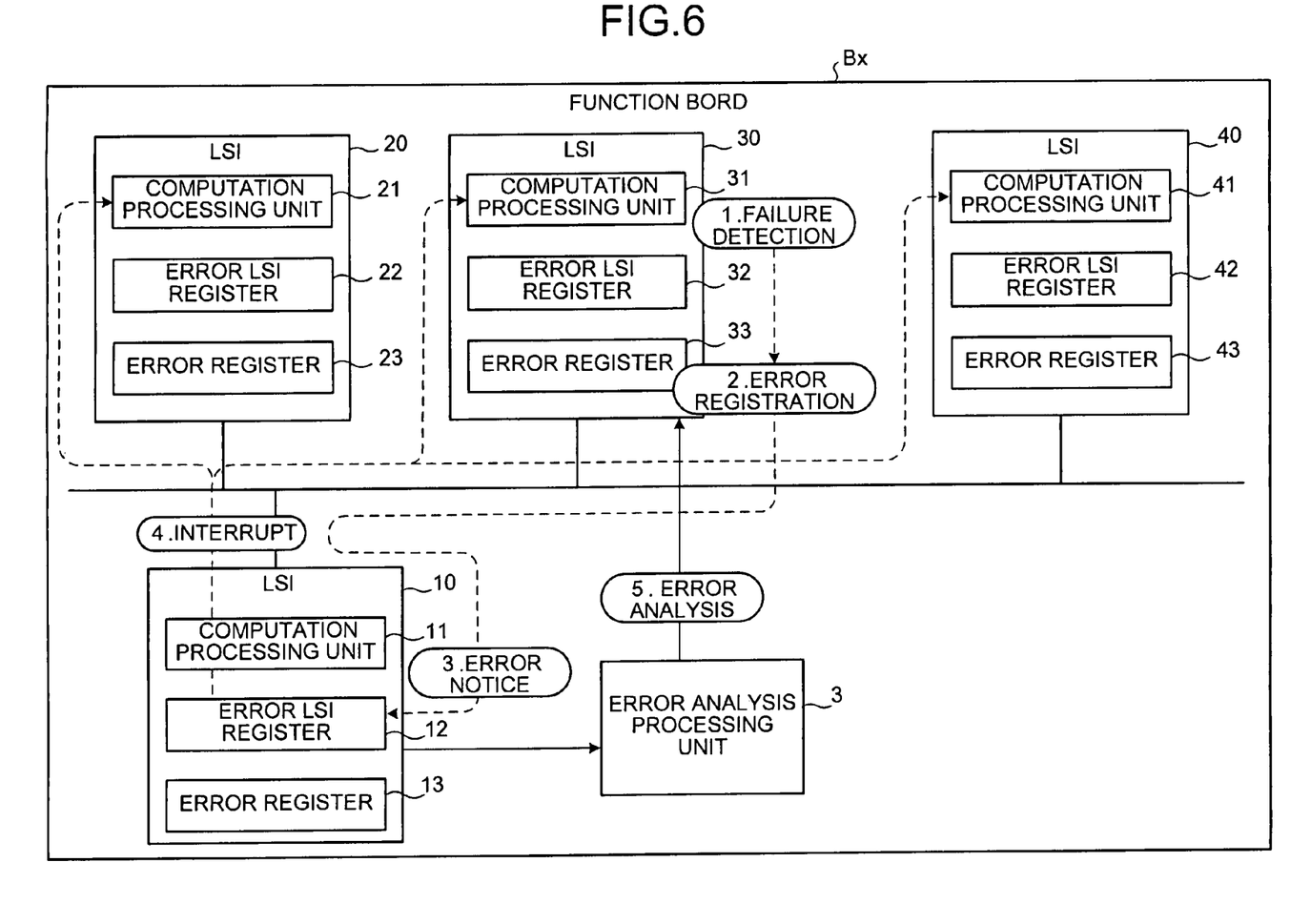
FIG. 6 is a schematic of a computer system with the present invention applied to an error processing in a function board.

FIG. 6 is a schematic of a computer system with the present invention applied to an error processing in a function board. A function board Bx has LSI 10, LSI 20, LSI 30, LSI 40, and an error analysis processing unit 3 in its inside.

The LSIs 10, 20, 30, and 40 are computing units to realize the function of the function board Bx by acting in cooperation with one another. Moreover, each LSI has a arithmetic processing unit, an error LSI register, and an error register in its inside.

Specifically, the LSI 10 is provided with a arithmetic processing unit 11, an error LSI register 12, and an error register 13 inside the LSI 10. The arithmetic processing unit 11 is a processing unit that carries out computation processing in the LSI 10. Further, the error register 12 is a bit register that is used when an error occurs in the LSI 10, and the error LSI register 13 is a recording unit that records the presence or absence of error occurrence with respect to a plurality of LSIs 10, 20, 30, and 40, respectively.

Similarly, the LSIs 20, 30, and 40 have arithmetic processing units 21, 31, and 41, error LSI registers 22, 32, and 42, and error registers 23, 33, and 43, respectively.

That is, in the present structure, the arithmetic processing units 11, 21, 31, and 41 correspond to the arithmetic processing units C1 to Cn, respectively, shown in FIG. 1 and FIG. 4. The error LSI registers 12, 22, 32, and 42 correspond to the error board registers D1 to Dn, respectively, and the error registers 13, 23, 33, and 43 correspond to the error registers E1 to En, respectively.

Therefore, it is possible in the function board Bx to employ a method in which "a representative of LSI is determined, and the representative LSI manages an error LSI and executes interrupt to all LSIs" and a method in which "each LSI manages its error LSI and carries out its own interrupt processing", respectively.

Figure 7:
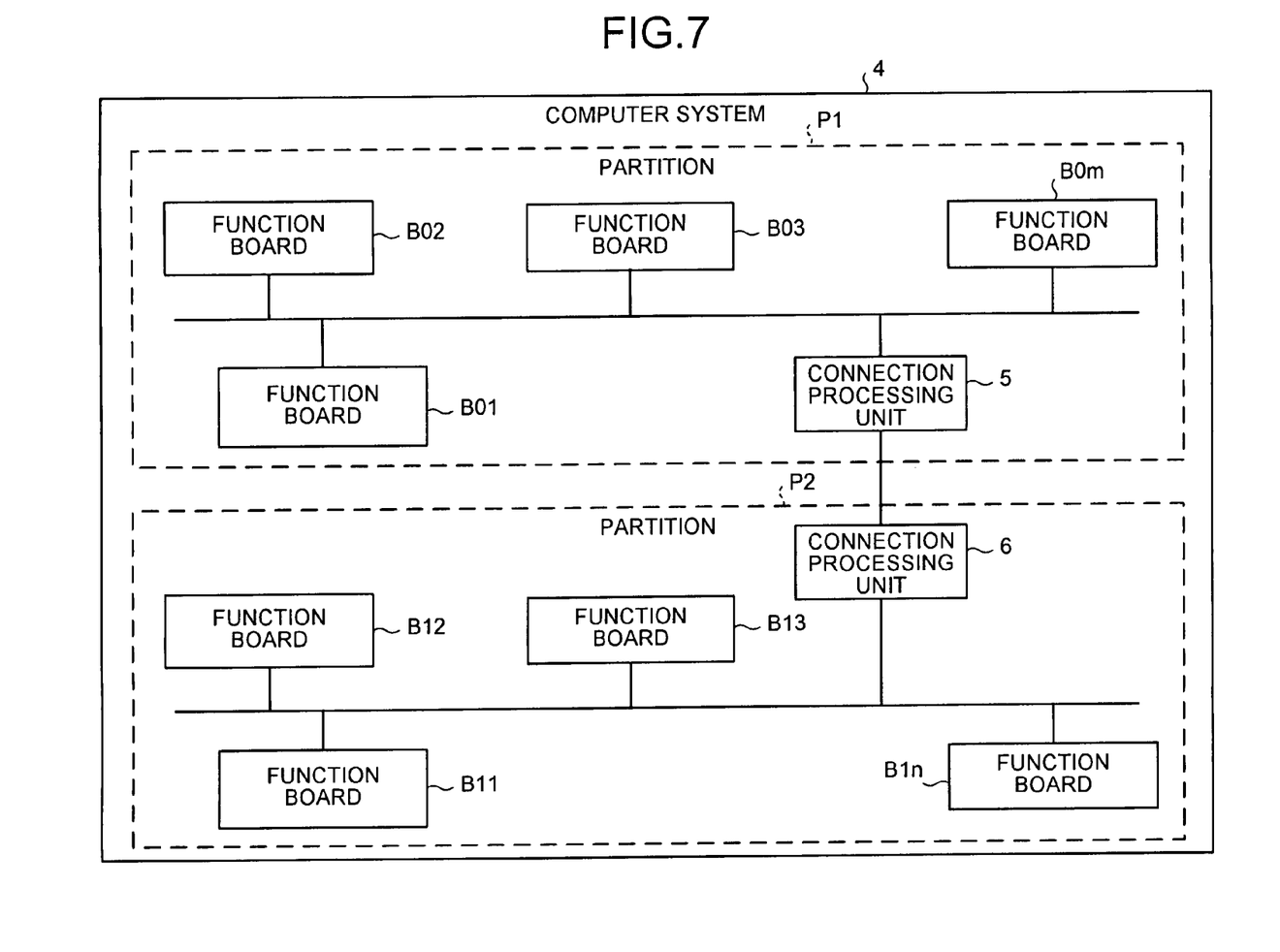
FIG. 7 is a schematic of a computer system having a plurality of partitions.

On the other hand, on employing the present invention, a structure in which the inside of one system is divided into a plurality of sections and error management is conducted inside the respective divided sections is also acceptable. FIG. 7 represents a structural example in which a computer system 4 is divided into two sections that are a partition P1 and a partition P2, and error management is independently conducted in each partition.

As shown in FIG. 7, the partition P1 is provided with function boards B01 to B0m, and the partition P2 is provided with function boards B11 to B1n. Further, the partition P1 and the partition P2 are connected to each other by connection processing units 5 and 6.

When the system has a plurality of partitions as described above, the present invention may be independently applied to each partition.

As described above, according to the present embodiment, the system provided with a plurality of computing units (function board and LSI) is provided with a register that specifies a computing unit (error board register and error LSI register) having an error occurrence in at least one of the computing units, and reading out errors in all computing units at the time of error occurrence is made unnecessary by specifying the computing unit in which the error has occurred, thereby allowing to carry out swift error processing without putting any loads on the system.

According to the present invention, an information processing apparatus and an error detection method that allow to swiftly shift to error processing without putting any loads on the system can be obtained.

Furthermore, according to the present invention, an information processing apparatus and an error detection method that allow to carry out swift error processing without putting any loads on the system with the use of the representative computing unit can be obtained.

Moreover, according to the present invention, an information processing apparatus and an error detection method that allow to carry out swift error processing without putting any loads on the system due to the autonomous interrupt can be obtained.

Furthermore, according to the present invention, an information processing apparatus that allows to swiftly shift to error processing without putting any loads on the system and conduct error analysis with ease can be obtained is offered.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing apparatus, comprising:
   a plurality of computing units, one of which includes a recording unit that records a status of an error occurrence in any of the computing units, wherein
   each of the computing units includes an error notifying unit that notifies an error occurrence in the computing unit to the one of the computing units that includes the recording unit so that errors are processed based on the status recorded in the record unit by accessing only the one of the computing units that includes the recording unit, and
   the recording unit includes an error analyzing unit that performs an error analysis processing for a computing unit with the error occurrence recorded in the recording unit.

2. The information processing apparatus according to claim 1, wherein a computing unit that has received a notice of the error occurrence from the error notifying unit performs an interrupt processing to other computing units.

3. The information processing apparatus according to claim 2, wherein
   a representative computing unit is determined from among the computing units, and the error notifying unit notifies the error occurrence to the representative computing unit.

4. The information processing apparatus according to claim 1, wherein the error notifying unit notifies the error occurrence to all other computing units, and
   each of the computing units that have received a notice of the error occurrence generates an interrupt to its own arithmetic processing.

5. The information processing apparatus according to claim 1, wherein
   at least another one of the computing units includes an error recording unit that functions as the recording unit, and
   the error notifying units notify the error occurrence to all computing units having an error recording unit so that errors are processed based on the status recorded in any error recording unit by accessing only one of the computing units which has an error recording unit.

6. An error detection method for detecting an error in an information processing apparatus having a plurality of computing units, the error detection method comprising:
   detecting an error occurrence in a computing unit among the plurality of computing units, by the computing unit in which an error occurred;
   notifying the error occurrence from the computing unit to other computing units of the plurality of computing units;
   recording a status of the error occurrence by the computing units, in a respective recording unit of each of the other computing units;
   interrupting processing upon being notified of the error occurrence; and
   analyzing the error based on a record of the error in the computing unit in which the error occurred located based on the status of error occurrence in the recording unit of any of the computing units.

7. The error detection method according to claim 6, further comprising determining a representative computing unit from among the computing units, wherein
   the error occurrence is notified to the representative computing, and
   the representative computing unit performs the interrupt processing to the other computing units than the representative computing unit in the plurality of computing units.

8. The error detection method according to claim 6, wherein
   the computing unit that has detected the error notifies the error occurrence to all of the other computing units, and
   each of the other computing units that have received the notice of the error occurrence generates an interrupt to its own arithmetic processing.

9. The error detection method according to claim 6, wherein
   each of the plurality of computing units includes an error recording unit that records the error when the error occurs in the each of the plurality of computing units, and
   the computing unit that has detected the error notifies the error occurrence to the other computing units based on the error recorded in the error recording unit.

* * * * *